3,317,380
PROCESS FOR INDUCING ANOREXIA
William Veldkamp, Kalamazoo Township, Kalamazoo County, Mich., assignor to The Upjohn Company, Kalamazoo, Mich., a corporation of Delaware
No Drawing. Continuation of application Ser. No. 293,131, July 5, 1963. This application Mar. 19, 1965, Ser. No. 441,332
4 Claims. (Cl. 167—55)

This application is a continuation of application Serial No. 293,131, filed July 5, 1963 now abandoned.

This invention relates to a therapeutic composition and process of treatment and more particularly to therapeutic compositions comprising an α,α-diphenyl-β-methyl-1-pyrrolidinepropanol in combination with a pharmaceutical carrier and a method for inducing anorexia comprising the administration of the said compositions.

The therapeutic compositions of the present invention comprise a member selected from the group consisting of α,α-diphenyl-β-methyl-1-pyrrolidinepropanol and the acid addition salts thereof, as an essential active ingredient in combination with a pharmaceutically acceptable diluent or carrier. The composition can be compounded in unit dosage form containing from about 25 to about 500 mg. of said member per dosage unit.

The administration of the compositions of the present invention provides a method for inducing anorexia in an obese subject. The amount of an α,α-diphenyl-β-methyl-1-pyrrolidinepropanol to be administered varies with the weight, condition, age, route of administration and species of the subject. In general a dose of from 3 to 15 mg./kg. of subject body weight or a total daily dose of from about 25 to about 500 mg. is effective for inducing anorexia.

It is to be understood that the term "α,α-diphenyl-β-methyl-1-pyrrolidinepropanol" as employed herein is inclusive of the d, l, and dl forms unless otherwise specified.

The dl-α,α-diphenyl-β-methyl-1-pyrrolidinepropanol can be prepared by reacting a phenyl Grignard reagent, preferably phenylmagnesium bromide, with alkyl (preferably methyl or ethyl) α-methyl-1-pyrrolidinepropionate in an anhydrous solvent system, e.g., diethyl ether; decomposing the reaction product by pouring the reaction mixture into acidified ice water, e.g., hydrochloric acid; and collecting the acid addition salt. The free base can be obtained by dispersing the acid addition salt in water and basifying the solution, e.g., with sodium hydroxide. The free base can be purified by conventional procedures such as by recrystallization from a suitable solvent, e.g., ethanol.

The racemic compound, prepared as described above, can be resolved into the optically active d and l forms. For this purpose there can be employed optically active acids commonly used for the resolution of amines, e.g., d- and l-tartaric acids (preferred), d-10-camphorsulfonic acid, dibenzoyl-d-tartaric acid (the dibenzoate of d-tartaric acid), d-camphoric acid, and the like. The diastereoisomeric salts can be separated by fractional crystallization from a suitable solvent, e.g., acetone, isopropyl alcohol, and the like.

The separated diastereoisomeric salt (e.g., d-α,α-diphenyl-β-methyl-1-pyrrolidinepropanol d-tartrate or d-α,α-diphenyl-β-methyl-1-pyrrolidinepropanol l-tartrate) is then dissolved in water, the solution is made alkaline with sodium hydroxide (other bases such as ammonium hydroxide or potassium hydroxide can likewise be employed), and the desired d-α,α-diphenyl-β-methyl-1-pyrrolidinepropanol free base can be separated from the mixture, e.g., by filtration, and purified in a conventional manner, e.g., by recrystallization from a suitable solvent such as isopropyl alcohol. Starting with l-α,α-diphenyl-β-methyl-1-pyrrolidinepropanol d-tartrate or l-α,α-diphenyl-β-methyl-1-pyrrolidinepropanol l-tartrate, l-α,α-diphenyl-β-methyl-1-pyrrolidinepropanol is obtained in the same manner.

Pharmacologically acceptable acid addition salts can be prepared by neutralization of α,α-diphenyl-β-methyl-1-pyrrolidinepropanol free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cyclohexanesulfamic, citric and methanesulfonic acids, and like pharmacologically acceptable acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of α,α-diphenyl-β-methyl-1-pyrrolidinepropanol free base, the acid, and the acid addition salt. If the acid is soluble in water, the α,α-diphenyl-β-methyl-1-pyrrolidinepropanol free base can be dissolved in water containing an equivalent amount of the acid, and thereafter, the water can be removed by evaporation; in some instances the salt precipitates from the aqueous solution, particularly when cooled, and evaporation is not necessary. If the acid is soluble in a relatively non-polar solvent, for example, diethyl ether or diisopropyl ether, separate solutions of the acid and α,α-diphenyl-β-methyl-1-pyrrolidinepropanol free base in such a solvent can be mixed in equivalent amounts, whereupon the acid addition salt will usually precipitate because of its relatively low solubility in the non-polar solvent. Alternatively, the α,α-diphenyl-β-methyl-1-pyrrolidinepropanol free base can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

An α,α-diphenyl-β-methyl-1-pyrrolidinepropanol is presented for oral administration in solid and liquid unit dosage forms, such as tablets, capsules, powders, granules, syrups, elixirs, and the like, containing suitable quantities of an α,α-diphenyl-β-methyl-1-pyrrolidinepropanol.

Powders are quite simply prepared by comminuting an α,α-diphenyl-β-methyl-1-pyrrolidinepropanol to a suitably fine size and mixing with a similarly comminuted diluent. The diluent can be an edible carbohydrate material such as starch. Advantageously, a sweetening agent or sugar is present as well as a flavoring oil. Dry granulations for reconstitution with water are prepared utilizing water-soluble diluents. A powder mixture of finely divided α,α-diphenyl-β-methyl-1-pyrrolidinepropanol and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring oil.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing α,α-diphenyl-β-methyl-1-pyrrolidinepropanol suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. As an alternative to granulating, the powder mixture can be slugged, i.e., run through the tablet machine and the resulting large tablets broken into pieces (slugs). The slugs can be lubricated to prevent sticking to the tablet-forming dies by means of addition of stearic acid, a stearate salt, talc or mineral oil. The lubricated mixture is then compressed into tablets.

Advantageously the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of an $\alpha,\alpha$-diphenyl-$\beta$-methyl-1-pyrrolidinepropanol for administrations.

A syrup is prepared by dispersing an $\alpha,\alpha$-diphenyl-$\beta$-methyl-1-pyrrolidinepropanol in a suitably flavored aqueous sucrose solution. Similarly, an elixir is prepared utilizing a hydroalcoholic vehicle. Elixirs are advantageous vehicles for use when another therapeutic agent which is not sufficiently water soluble is to be included in the composition.

For parenteral administration aqueous fluid unit dosage forms can be prepared. In preparing the parenteral form, a measured amount of a water soluble salt of $\alpha,\alpha$-diphenyl-$\beta$-methyl-1-pyrrolidinepropanol and a pharmacologically acceptable acid is placed in a vial, the vial and its contents sterilized and sealed. An accompanying vial of sterile water is provided as a vehicle to form a solution prior to administration. Advantageously the sterile water can have dissolved therein a local anesthetic and buffering agents.

Alternatively, a parenteral suspension can be prepared by suspending an $\alpha,\alpha$-diphenyl-$\beta$-methyl-1-pyrrolidinepropanol in a parenterally acceptable vegetable oil with or without additional adjuvants.

In addition to oral and parenteral administration, the rectal route can be utilized. An $\alpha,\alpha$-diphenyl-$\beta$-methyl-1-pyrrolidinepropanol can be administered by means of a suppository. A vehicle which has a melting point at about body temperature or one that is readily soluble can be utilized. For example, cocoa butter and various polyethylene glycols can serve as the vehicle.

For the treatment of domestic birds and animals by oral administration, the $\alpha,\alpha$-diphenyl-$\beta$-methyl-1-pyrrolidinepropanol is conveniently prepared in the form of a food premix. The food premix can comprise the active material in admixture with an edible pharmaceutical diluent such as starch, oatmeal, flour, calcium carbonate, talc, dried fish meal and the like non-toxic, edible diluents. The premix is then conveniently added to the regular feed, thereby providing medication to the mammal or bird in the course of feeding.

The term unit dosage form as used in the specification and claims refers to physically discrete units usitable as unitary dosages for animal subjects, each unit containing a predetermined quantity of active material calculated to produce anorexia in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use as disclosed in detail in this specification, these being features of the present invention. Examples of suitable oral unit dosage forms in accord with this invention are tablets, capsules, powders, packets, granules, wafers, teaspoonfuls, segregated multiples of any of the foregoing, and other forms as herein described.

In addition to the administration of $\alpha,\alpha$-diphenyl-$\beta$-methyl-1-pyrrolidinepropanol as the principal active ingredient of compositions for the treatment of obesity, the said compound of the novel compositions can be included with other types of compounds to obtain advantageous combinations of properties. Such combinations include anorexigenics such as d-amphetamine benzphetamine, methamphetamine, and the like; sedatives such as barbital, phenobarbital, pentobarbital, amobarbital, secobarbital, hexobarbital, and the like; ataractics such as prochlorperazine, meprobamate, chloropromazine, promazine, azacyclonol, phenaglycodol, and the like; bulking agents such as methylcellulose.

The following examples are illustrative of the compositions and process of the invention, but are not to be construed as limiting the scope thereof.

*Example 1—dl-$\alpha,\alpha$-Diphenyl-$\beta$-methyl-1-pyrrolidinepropanol*

A solution of phenylmagnesium bromide was prepared from 48.6 gm. (2 moles) of magnesium, 210 ml. (2 moles) of bromobenzene, and 800 ml. of absolute ether. To this solution was slowly added a solution of 65.5 gm. (0.382 mole) of methyl - dl - $\alpha$ - methyl - 1 - pyrrolidinepropionate [R. B. Moffett, J. Org. Chem. 14, 862 (1949)] in 100 ml. of absolute ether. After stirring under reflux for 2 hours the mixture was cooled and decomposed by pouring into about 1000 ml. of ice water containing 250 ml. of concentrated hydrochloric acid. The resulting white precipitate was collected on a filter, washed successively with water and ether, and dried. The white precipitate was dissolved in 2.5 liters of boiling water and basified with 10% aqueous sodium hydroxide solution. After cooling, the resulting crystalline dl-$\alpha,\alpha$-diphenyl-$\beta$-methyl-1-pyrrolidinepropanol was collected on a filter, washed with water and dried, to provide 102 gm. (90.6% of theory) of crystalline solid with a melting point of 116–118° C. The compound was recrystallized from 500 ml. of 95% ethanol to provide 88.1 gm. of white crystals with a melting point of 118–119° C.

*Analysis.*—Calcd. for $C_{20}H_{25}NO$: N, 4.74. Found: N, 4.74.

*Example 2.—dl-$\alpha,\alpha$-Diphenyl-$\beta$-methyl-1-pyrrolidinepropanol hydrochloride*

Thirty grams of the dl free base prepared according to Example 1 was dissolved in 500 ml. of hot water containing 10 ml. of concentrated hydrochloric acid. On cooling the solution the hydrochloride crystallized. The salt was collected on a filter, washed successively with water and ether, and dried, providing 25.1 grams (74.6% of theory) of white crystals of dl-$\alpha,\alpha$-dipheny-$\beta$-methyl-1-pyrrolidinepropanol hydrochloride having a melting point of 230–231° C.

*Analysis.*—Calcd. for $C_{20}H_{26}ClNO$: Cl, 10.68. Found: Cl, 10.66.

*Example 3*

Following the procedure of Example 2, substituting hydrobromic acid, sulfuric acid, nitric acid, phosphoric acid, acetic acid, lactic acid, benzoic acid, salicylic acid, glycolic acid, succinic acid, maleic acid, malic acid, pamoic acid, cyclohexanesulfamic acid, citric acid, and methanesulfonic acid for hydrochloric acid, the respective acid addition salts can be obtained.

*Example 4.—d- and l-$\alpha,\alpha$-Diphenyl-$\beta$-methyl-1-pyrrolidinepropanol d-tartrates*

A solution of 29.5 gm. (0.1 mole) of the dl free base prepared according to Example 1 and 15.0 gm. (0.1 mole) of d-tartaric acid in 350 ml. of acetone containing about 10 ml. of water was concentrated in vacuo to 150 ml., during which time considerable white solid separated. This solid was collected by filtration, washed with moist acetone, and dried, giving 27.1 gm. (61% of theory) of white solid; M.P. 63–70° C.; $[\alpha]_D^{25}$ +36.5°±0.4° (0.4455 gm. in 25 ml. of water). The sample used for the rotation was evaporated in vacuo and added to the rest of the solid which was recrystallized six times from 80% isopropyl alcohol (rotation taken between each recrystallization), giving 9.9 gm. of white crystalline *l*-α,α-diphenyl-β-methyl-1-pyrrolidinepropanol *d*-tartrate; M.P. 68–97° C.; $[\alpha]_D^{25}$ +46.9°±0.5° (0.2903 gm. in 25 ml. of water).

Karl Fischer analysis showed 1.40% $H_2O$.

*Analysis.*—Calcd. for $C_{24}H_{31}NO_7$: C, 64.70; H, 7.01; N, 3.14. Found: C, 64.26; H, 7.58; N, 2.91.

The above acetone filtrate was evaporated to dryness, giving 24 gm. of moist, gummy, solid *d*-α,α-diphenyl-β-methyl-1-pyrrolidinepropanol *d*-tartrate. A thoroughly dried sample was a glass, having a M.P. about 78–87° C.; $[\alpha]_D^{25}$ −25.6°±0.6° (0.200 gm. in 25 ml. of water).

*Example 5.—d-α,α-Diphenyl-β-methyl-1-pyrrolidinepropanol l-tartrate*

The crude gummy solid ($[\alpha]_D^{25}$ −25.6°) of Example 4 was dissolved in water, filtered, and converted to the free base with a slight excess of 10% aqueous sodium hydroxide solution. The crystalline crude *d*-free base was collected, washed with water, and dried giving 13.85 gm. (47% of theory) of nearly white solid; M.P. 127–135° C.; $[\alpha]_D^{25}$ +32.7°±0.5° (0.2709 gm. in 25 ml. of chloroform). The crude *d*-free base was suspended in 80 ml. of isopropyl alcohol and 7.05 gm. of 1-tartaric acid in 20 ml. of water was added. The mixture was warmed to effect solution and on cooling crystals separated. The crystals were collected and recrystallized twice from 80% isopropyl alcohol (rotation taken between recrystallizations), giving 13.1 gm. of white crystalline *d*-α,α-diphenyl-β-methyl-1-pyrrolidinepropanol *l*-tartrate; M.P. 86–97° C.; $[\alpha]_D^{25}$ −48.2°±0.5° (0.2827 gm. in 25 ml. of water).

Karl Fischer analysis showed 1.52% $H_2O$.

*Analysis.*—Calcd. for $C_{24}H_{31}NO_7$: C, 64.70; H, 7.01; N, 3.14. Found: C, 64.19; H, 7.68; N, 3.05.

*Example 6.—l-α,α-Diphenyl-β-methyl-1-pyrrolidinepropanol*

The *l*-α,α-diphenyl-β-methyl-1-pyrrolidinepropanol *d*-tartrate ($[\alpha]_D^{25}$ +46.9°) prepared in Example 4 was combined with the solid material obtained by evaporating the filtrates from the last three recrystallizations (in which there was little change in rotation), dissolved in water, filtered, and basified with a slight excess of 10% aqueous sodium hydroxide solution. The resulting crystalline free base was collected, washed with water, and dried giving 9.37 gm. of white solid; M.P. 133.5–137° C.; $[\alpha]_D^{25}$ −39.0°±0.8°. This was recrystallized from 100 ml. of isopropyl alcohol, giving 8.8 gm. of white crystals of *l*-α,α-diphenyl-β-methyl-1-pyrrolidinepropanol having a M.P. of 135–137.5° C.; $[\alpha]_D^{25}$ −38.9°±0.5° (0.2952 gm. in 25 ml. of chloroform).

*Analysis.*—Calcd. for $C_{20}H_{25}NO$: C, 81.31; H, 8.53; N, 4.74. Found: C, 81.31; H, 8.60; N, 4.55.

*Example 7.—Hydrochloride of l-α,α-diphenyl-β-methyl-1-pyrrolidinepropanol*

8.5 gm. of the *l*-α,α-diphenyl-β-methyl-1-pyrrolidinepropanol prepared in Example 6 was dissolved in 60 ml. of warm absolute ethanol and acidified with 4 ml. of about 7.1 N ethanolic hydrogen chloride. On cooling the hydrochloride crystallized. This was collected, washed with ethanol and absolute ether, and dried giving 9.2 gm. (96% of theory) of white crystalline hydrochloride of *l*-α,α-diphenyl-β-methyl-1-pyrrolidinepropanol having a M.P. of 235–236° C. (dec.); $[\alpha]_D^{25}$ +39°±1° (0.7010 gm. in 100 ml. of methanol).

*Analysis.*—Calcd. for $C_{22}H_{26}ClNO$: C, 72.38; H, 7.90; Cl, 10.68; N, 4.22. Found: C, 72.11; H, 8.17; Cl, 10.48; N, 4.16.

*Example 8.—d-α,α-Diphenyl-β-methyl-1-pyrrolidinepropanol*

The *d*-α,α-diphenyl-β-methyl-1-pyrrolidinepropanol *l*-tartrate prepared in Example 5 ($[\alpha]_D^{25}$ −48.2°) was combined with the solid material obtained by evaporating the filtrate from the last recrystallization (in which there was little change in rotation), dissolved in water, filtered, and basified with a slight excess of 10% aqueous sodium hydroxide solution. The resulting crystalline free base was collected, washed with water and dried, giving 8.8 gm. of white *d*-α,α-diphenyl-β-methyl-1-pyrrolidinepropanol having a M.P. of 135–137.5° C.; $[\alpha]_D^{25}$ +38.4°±0.5°. This was recrystallized from 100 ml. of isopropyl alcohol, giving 8.4 gm. of white crystals; M.P. 135–137.5° C.; $[\alpha]_D^{25}$ +38.1°±0.5° (0.3084 gm. in 25 ml. of chloroform).

*Analysis.*—Calcd. for $C_{20}H_{25}NO$: C, 81.31; H, 8.53; N, 4.74. Found: C, 81.14; H, 8.77; N, 4.68.

*Example 9.—Hydrochloride of d-α,α-diphenyl-β-methyl-1-pyrrolidinepropanol*

8.05 gm. of the *d*-α,α-diphenyl-β-methyl-1-pyrrolidinepropanol prepared in Example 8 was dissolved in 60 ml. of warm absolute ethanol and acidified with 4 ml. of about 7.1 N ethanolic hydrogen chloride. On cooling the hydrochloride crystallized. This was collected, washed with ethanol and absolute ether, and dried, giving 8.6 gm. (96% of theory) of white crystalline hydrochloride of *d*-α,α-diphenyl-β-methyl-1-pyrrolidinepropanol having M.P. of 234–235.5° C. (dec.); $[\alpha]_D^{25}$ −41°±1° (0.6442 gm. in 100 ml. of methanol).

*Analysis.*—Calcd. for $C_{20}H_{26}ClNO$: C, 72.38; H, 7.90; Cl, 10.68; N, 4.22. Found: C, 72.45; H, 8.06; Cl, 10.59; N, 4.13.

*Example 10*

One thousand tablets are prepared from the following types and amounts of ingredients:

| | Gm. |
|---|---|
| α,α - Diphenyl-β-methyl-1-pyrrolidinepropanol hydrochloride | 500 |
| Citric acid, powder | 50 |
| Talc | 50 |
| Magnesium stearate | 2.5 |

The ingredients are mixed together and slugged. The slugs are screened and pressed into tablets.

*Example 11*

One thousand hard gelatin capsules are prepared from the following types and amounts of ingredients:

| | Gm. |
|---|---|
| α,α - Diphenyl - β-methyl-1-pyrrolidinepropanol sulfate | 250 |
| Ascorbic acid | 15 |
| Starch | 25 |
| Terra alba | 75 |
| Magnesium stearate | 3.5 |

The ingredients are powdered and mixed together until uniformly dispersed and filled into hard gelatin capsules.

*Example 12*

One thousand tablets for oral administration, each containing 100 mg. of α,α-diphenyl-β-methyl-1-pyrrolidinepropanol hydrochloride and 16.2 mg. of phenobarbital are prepared from the following types and amounts of ingredients:

| | Gm. |
|---|---|
| α,α - Diphenyl-β-methyl-1-pyrrolidinepropanol hydrochloride | 100 |
| Phenobarbital | 16.2 |
| Lactose | 75 |
| Starch | 15 |
| Magnesium stearate | 1.5 |

The ingredients are thoroughly mixed and slugged. The slugs are broken down by forcing through a screen and the resulting granules are then compressed into tablets.

Example 13

One thousand cc. of a syrup is prepared from the following types and amounts of ingredients:

α,α-Diphenyl-β-methyl-1-pyrrolidinepropanol hydrochloride, 50 gm.
Cacao syrup, U.S.P., q.s., 1000 cc.

The α,α-diphenyl-β-methyl-1-pyrrolidinepropanol hydrochloride is stirred with the cacao syrup until dissolved and uniformly dispersed.

Example 14

One thousand cc. of an elixir, containing 100 mg. of α,α-diphenyl-β-methyl-1-pyrrolidinepropanol hydrochloride and 8.1 mg. of phenobarbital in each 5 cc., is prepared from the following types and amounts of ingredients:

| | |
|---|---|
| α,α-Diphenyl-β-methyl-1-pyrrolidinepropanol hydrochloride _____gm__ | 20 |
| Phenobarbital _____gm__ | 1.62 |
| Citric acid _____gm__ | 0.1 |
| F.D.C. Red No. 1 _____gm__ | 0.04 |
| Saccharin _____gm__ | 0.1 |
| Sucrose _____gm__ | 200 |
| Oil of spearmint _____gm__ | 0.1 |
| Oil of wintergreen _____gm__ | 0.1 |
| Polysorbate 80, U.S.P. _____gm__ | 1 |
| Ethanol, 95% _____cc__ | 200 |
| Glycerin _____cc__ | 150 |
| Water, q.s., 1000 cc. | |

The sugar is dissolved in 450 cc. of water and the citric acid, color, and the α,α-diphenyl-β-methyl-1-pyrrolidinepropanol hydrochloride added thereto. The phenobarbital and saccharin are added to the mixture of alcohol and glycerin and stirred until dissolved. The flavors are mixed with the polysorbate 80 and added to the alcohol-glycerin solution followed by the addition of the sugar solution and sufficient water to make 1000 cc.

Example 15

A sterile aqueous solution for parenteral administration, containing 50 mg. of α,α-diphenyl-β-methyl-1-pyrrolidinepropanol acetate in each cc., is prepared from the following types and amounts of ingredients:

| | Gm. |
|---|---|
| α,α-Diphenyl-β-methyl-1-pyrrolidinepropanol acetate | 50 |
| Chlorobutanol, anhydrous | 5 |
| Water for injection, 1000 cc. | |

The α,α-diphenyl-β-methyl-1-pyrrolidinepropanol and chlorobutanol are dissolved in the water for injection and the solution sterilized by filtration. The sterile solution is filled into 2 cc. sterile vials and sealed.

Example 16

One thousand hard gelatin capsules are prepared from the following types and amounts of ingredients:

| | Gm. |
|---|---|
| α,α-Diphenyl-β-methyl-1-pyrrolidinepropanol hydrochloride | 125 |
| Benzphetamine | 25 |
| Starch | 25 |
| Terra alba | 75 |
| Magnesium stearate | 3.5 |

The ingredients are powdered and mixed together until uniformly dispersed and filled into hard gelatin capsules.

Following the procedure of the preceding Example 16, capsules are similarly prepared substituting 5 gms. of d-amphetamine sulfate and 5 gms. of methamphetamine, respectively for the 25 gms. of benzphetamine.

Example 17

The compositions of the preceding Examples 10 through 15, inclusive, are usefully administered to obese dogs for inducing anorexia whereby weight reduction is obtained.

What is claimed is:
1. A process for inducing anorexia comprising the administration of a member selected from the group consisting of α,α-diphenyl-β-methyl-1-pyrrolidinepropanol and the pharmacologically acceptable acid addition salts thereof to an obese animal.
2. A process for inducing anorexia comprising the administration of a member selected from the group consisting of α,α-diphenyl-β-methyl-1-pyrrolidinepropanol and the pharmacologically acceptable acid addition salts thereof to an obese animal at a dose of from about 3 mg. to about 15 mg. of said member per kg. body weight of said subject.
3. A process for inducing anorexia comprising the administration in unit dosage form of from about 25 to about 500 mg. of a member selected from the group consisting of α,α-diphenyl-β-methyl-1-pyrrolidinepropanol and the pharmacologically acceptable acid addition salts thereof in association with a pharmaceutical carrier to an obese animal.
4. A process for inducing anorexia comprising the administration to an obese animal, in unit dosage form, of from about 25 to about 500 mg. of a member selected from the group consisting of α,α-diphenyl-β-methyl-1-pyrrolidinepropanol and the pharmacologically acceptable acid addition salts thereof, in combination with from about 5 to about 25 mg. of a member selected from the group consisting of amphetamine, methamphetamine, benzamphetamine, and the pharmacologically acceptable acid addition salts thereof, in association with a pharmaceutical carrier.

References Cited by the Examiner

UNITED STATES PATENTS 3,190,920  6/1965  Spickett _____ 260—570

FOREIGN PATENTS 624,118  5/1949  Great Britain.
627,139  7/1949  Great Britain.

SAM ROSEN, Primary Examiner.

N. MANN, STANLEY J. FRIEDMAN,
Assistant Examiners.